(12) United States Patent
Rico et al.

(10) Patent No.: US 12,537,402 B2
(45) Date of Patent: Jan. 27, 2026

(54) GENERATOR WITH HIGH-PRESSURE AIR COOLING

(71) Applicant: SIEMENS ENERGY, INC., Orlando, FL (US)

(72) Inventors: Raul Ricardo Rico, Oviedo, FL (US); Christopher Lowry, McAdenville, NC (US); Joshua R. Brown, Concord, NC (US); Hyunkee Lee, Charlotte, NC (US); Tomas Valenta, Liberec (CZ); David Holland, Charlotte, NC (US)

(73) Assignee: SIEMENS ENERGY, INC., Orlando, FL (US)

( * ) Notice: Subject to any disclaimer, the term of this patent is extended or adjusted under 35 U.S.C. 154(b) by 307 days.

(21) Appl. No.: 18/281,611

(22) PCT Filed: Mar. 17, 2021

(86) PCT No.: PCT/US2021/022723
§ 371 (c)(1),
(2) Date: Sep. 12, 2023

(87) PCT Pub. No.: WO2022/197289
PCT Pub. Date: Sep. 22, 2022

(65) Prior Publication Data
US 2024/0213832 A1 Jun. 27, 2024

(51) Int. Cl.
*H02K 1/26* (2006.01)
*H02K 5/10* (2006.01)
*H02K 7/00* (2006.01)

(52) U.S. Cl.
CPC ............... *H02K 1/26* (2013.01); *H02K 5/10* (2013.01); *H02K 7/003* (2013.01)

(58) Field of Classification Search
CPC .. H02K 1/26; H02K 1/32; H02K 3/24; H02K 3/44; H02K 3/487; H02K 3/505;
(Continued)

(56) References Cited

U.S. PATENT DOCUMENTS

| 4,333,027 | A | * | 6/1982 | Madsen | ............... H02K 3/48 310/214 |
| 4,739,207 | A | | 4/1988 | Ying et al. | |

(Continued)

FOREIGN PATENT DOCUMENTS

| EP | 3101782 A1 | 12/2016 |
| WO | 2015034514 A1 | 3/2015 |

OTHER PUBLICATIONS

International Search Report and Written Opinion of the International Searching Authority mailed Dec. 10, 2021 corresponding to PCT Application No. PCT/US2021/022723 filed Mar. 17, 2021.

*Primary Examiner* — Naishadh N Desai

(57) ABSTRACT

A generator rotor including a rotor shaft having a rotor slot includes a rotor winding at least partially disposed within the rotor slot and a wedge coupled to the rotor shaft and extending axially along the rotor shaft, the wedge positioned to inhibit radial movement of the rotor winding from the rotor slot. A seal member is coupled to the wedge and extends axially along the wedge. The seal member cooperates with the wedge and the rotor shaft to define a seal therebetween. The wedge, the seal member, and the rotor shaft cooperate to at least partially define an enclosed space operable to contain a high-pressure coolant.

18 Claims, 9 Drawing Sheets

(58) Field of Classification Search
CPC ........... H02K 3/51; H02K 5/10; H02K 5/124; H02K 7/003; H02K 9/10; Y02E 10/72; Y02E 10/70
See application file for complete search history.

(56) References Cited

U.S. PATENT DOCUMENTS

| | | | |
|---|---|---|---|
| 5,068,564 A * | 11/1991 | Frank | H02K 3/51 277/408 |
| 5,118,979 A | 6/1992 | Shih et al. | |
| 5,122,698 A * | 6/1992 | Walker | H02K 3/16 310/214 |
| 6,121,708 A | 9/2000 | Mueller | |
| 10,833,547 B2 * | 11/2020 | Kuehn | H02K 3/527 |
| 2016/0204663 A1 * | 7/2016 | Huang | H02K 1/325 310/59 |
| 2017/0310186 A1 * | 10/2017 | Wang | H02K 1/16 |

* cited by examiner

GENERATOR WITH HIGH-PRESSURE AIR COOLING

BACKGROUND

Generators, and in particular three-phase synchronous generators are often used in power generation activities to generate grid-suitable electricity using a prime mover such as a gas turbine, steam turbine, wind turbine, hydro turbine, and the like. The generators generally include a stator that remains stationary during operation and a rotor that rotates with respect to the stator. The rotor often includes two or more poles that when rotated interact with the stator to generate the desired current at the desired frequency and voltage.

The power density of a generator is a function of the current density of the armature, and, by extension, the current density of the field winding (i.e., the rotor). In order to operate at higher current densities than traditional air cooling can provide, the field winding can be directly cooled using a fluid with improved thermodynamic properties as compared to air (e.g., hydrogen).

SUMMARY

In one aspect, a generator rotor includes a rotor shaft having a rotor slot includes a rotor winding at least partially disposed within the rotor slot and a wedge coupled to the rotor shaft and extending axially along the rotor shaft, the wedge positioned to inhibit radial movement of the rotor winding from the rotor slot. A seal member is coupled to the wedge and extends axially along the wedge. The seal member cooperates with the wedge and the rotor shaft to define a seal therebetween. The wedge, the seal member, and the rotor shaft cooperate to at least partially define an enclosed space operable to contain a high-pressure coolant.

In another aspect, a generator rotor includes a rotor shaft having a rotor slot. The rotor includes a rotor winding at least partially disposed within the rotor slot, a wedge coupled to the rotor shaft and positioned to inhibit radial movement of the rotor winding from the rotor slot, and a seal member coupled to the wedge. The seal member cooperates with the wedge and the rotor shaft to define a first space. A first retaining ring is coupled to the rotor shaft to define a second space between the first retaining ring and the rotor shaft, and a second retaining ring is coupled to the rotor shaft to define a third space between the second retaining ring and the rotor shaft. The second space is configured to receive a high-pressure coolant and direct the high-pressure coolant to the first space and the third space.

In another aspect, a generator rotor includes a rotor shaft having a rotor slot. The rotor includes a rotor winding at least partially disposed within the rotor slot and a wedge coupled to the rotor shaft and extending in an axial direction. The wedge is positioned to inhibit radial movement of the rotor winding from the rotor slot. A wedge insert is positioned adjacent the wedge, a wedge cap is positioned adjacent the wedge insert to sandwich the wedge insert between the wedge cap and the wedge, and a wedge bolt is threadably engaged with the wedge and operable to compress the wedge insert in the axial direction and to expand the wedge insert in the radial and circumferential directions. A ring seal extends around a circumference of the rotor and is positioned axially outboard of the wedge insert, a secondary seal extends around a circumference of the rotor and is positioned axially inboard of the wedge insert, and a retaining ring is coupled to the wedge such that each of the ring seal, the wedge insert, and the secondary seal each cooperate with the retaining ring and the wedge to form a seal therebetween.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
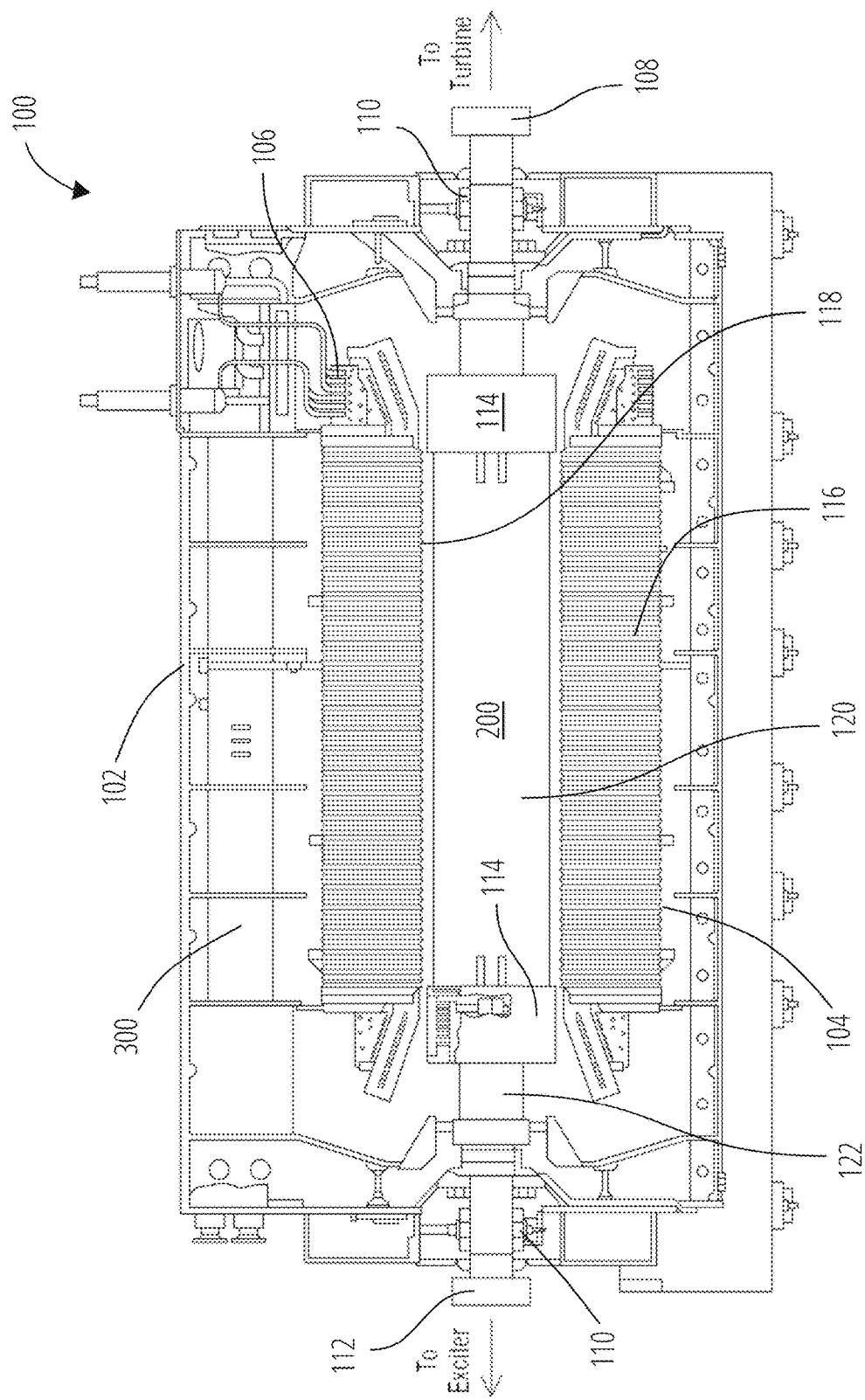
FIG. 1 is a cross-sectional view of a generator taken along the generator centerline, rotational, or longitudinal axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

As illustrated in FIG. 1, a generator 100 includes a stator 300 and a rotor 200 supported for rotation within the stator 300. The stator 300 includes a stator housing 102 that surrounds and substantially encloses a stator core 104. The stator core 104 is often made-up of a number of laminations 116 stacked in a longitudinal direction (along a rotational axis). Each lamination 116 includes cut outs or is otherwise shaped to define the desired features of the rotor body 120 including a bore 118 that is sized to receive the rotor 200.

In some constructions, a stator cooling system 106 is provided to cool the stator 300 and improve the efficiency and power density of the stator 300. In some constructions, a cooling gas is employed as a stator coolant. However, larger stators 300 may include liquid cooling such as water cooling.

The rotor 200 includes a rotor body 120, a rotor shaft 122, and two retaining rings 114 coupled to the rotor shaft 122. In many instances, the rotor body 120 is considered to be part of the rotor shaft 122. The illustrated rotor shaft 122 is supported for rotation by a bearing 110 positioned at each end of the rotor 200. A turbine coupling 108 is positioned at one end of the rotor 200 to facilitate connection of the rotor 200 to a turbine (e.g., combustion turbine, steam turbine, hydro turbine, wind turbine, etc.) or to another prime mover. The opposite end of the rotor 200 may include an exciter coupling 112 that allows for connection to an exciter or other rotating equipment.

The generator 100 illustrated in FIG. 1 is a synchronous generator 100. However, asynchronous generators or motors could include the features described herein.

Figure 2:
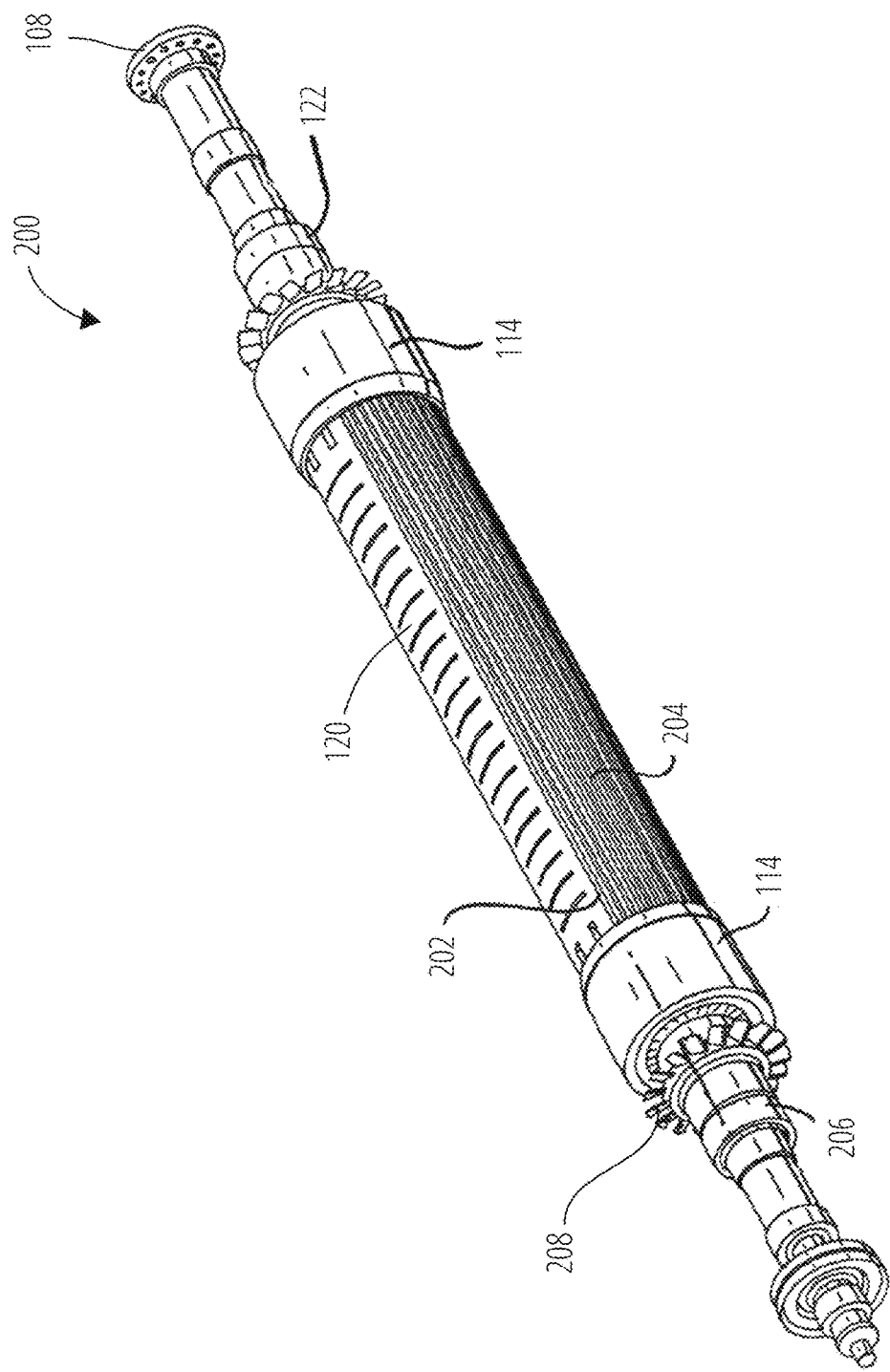
FIG. 2 is a perspective view of a rotor suitable for use in the generator of FIG. 1.

FIG. 2 illustrates the rotor 200 of FIG. 1 in greater detail. The rotor body 120 includes a series of rotor slots 202 that extend longitudinally along the rotor body 120. Rotor windings 204 are positioned within the rotor slots 202 to define one or more pairs of poles. In the illustrated construction two poles are formed by the rotor windings 204. However, other constructions could include four poles, eight poles or more poles if desired. The rotor 200, sometimes referred to as a field, also includes a slip ring 206 that provides a connection to an exciter that provides electrical current at a desired voltage to the rotor windings 204 to generate a magnetic field.

The rotor 200 may also include a rotor cooling system 208 that operates to cool the rotor 200. In some constructions, the rotor 200 is air-cooled with other constructions employing another fluid such as hydrogen.

Figure 3:
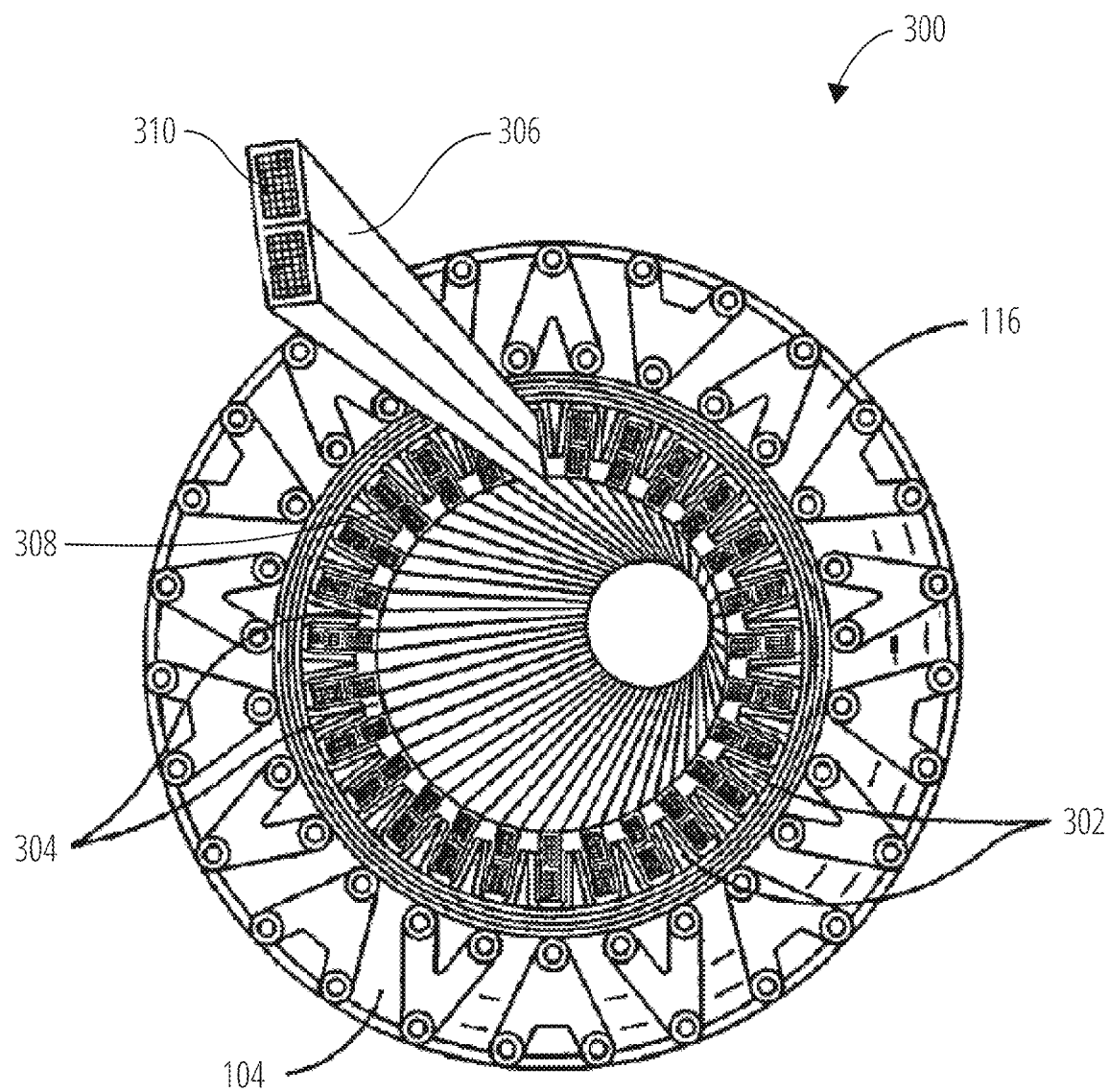
FIG. 3 is a perspective view of a portion of a stator suitable for use in the generator of FIG. 1.

Turning to FIG. 3, the stator core 104 is illustrated in greater detail. The stator core 104, in most constructions is formed from a series of laminations 116 that are stacked in the longitudinal direction. Each lamination 116 includes cut-outs, openings or features that when stacked define the desired features of the stator core 104. Each of the laminations 116 includes a number of teeth 302 that are evenly spaced circumferentially around the bore 118. The teeth 302 cooperate to define a series of slots that extend the length of the stator core 104. Bars 306 are positioned within the slots and are electrically connected to one another to define a series of stator windings. In the illustrated generator 100, the stator windings are arranged to define three phases. Generally, the three phases are electrically arranged to define a delta-circuit or a Y-circuit as may be desired. Of course, other constructions could include a single phase, or more than three phases (i.e., six phase) if desired.

As part of the stator cooling system 106, each of the bars 306 may include one or more coolant passages 310 that allow for the flow of coolant along the length of the bar 306. As discussed, a coolant fluid such as water is often employed to cool the stator 300. Of course, other stators may not employ any cooling if desired.

Figure 4:
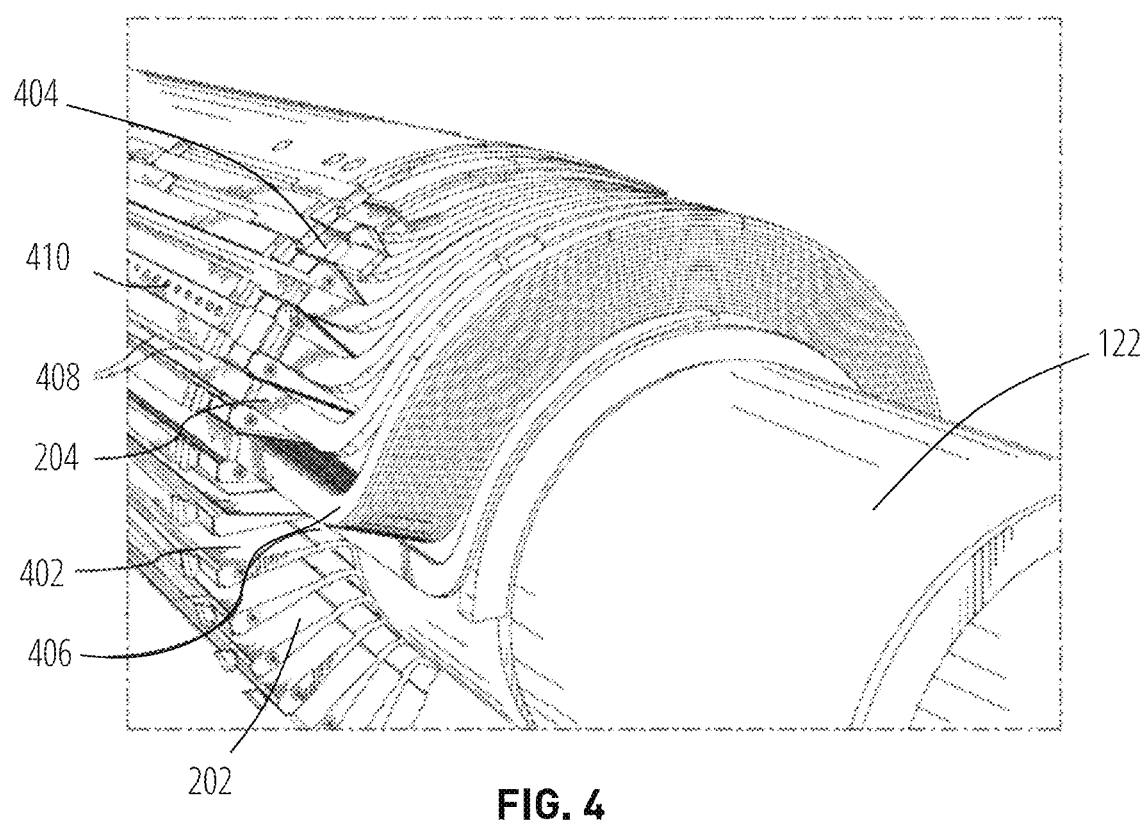
FIG. 4 is a perspective view of a rotor suitable for use in the generator of FIG. 1.

FIG. 4 better illustrates the rotor 200 of FIG. 2 with one of the retaining rings 114 removed. The rotor 200 is a two-pole rotor 200 with a single rotor winding 204 illustrated in place. The rotor 200 includes the rotor shaft 122 that supports a plurality of teeth 402 that extend radially outward around the circumference of the rotor shaft 122. In most constructions, the teeth 402 are machined from a solid shaft such that the teeth 402 and the rotor shaft 122 are a single inseparable component. Each tooth 402 cooperates with an adjacent tooth 402 to define one of the rotor slots 202 therebetween.

The teeth 402 each define an outer most surface that defines the largest diameter of the rotor shaft 122. A retaining ring fit 404 may be machined into the teeth 402 near their axial ends to provide a fit location for the retaining ring 114. Of course, other constructions may omit the retaining ring fit 404 if desired or may include a number of different arrangements of the retaining ring fit 404.

The rotor winding 204 is formed from a series of coils that define a continuous or complete loop. Thus, each coil extends along a first rotor slot 202 in a first axial direction, makes a loop at a first end to define an end turn 406, extends in a second axial direction in a second rotor slot 202 in a second direction opposite the first direction, and makes a second turn to complete the loop. A series of the coils are stacked and connected to one another to define the various rotor windings 204 that in turn cooperate to define the desired poles.

A layer of insulation 408 is positioned between adjacent coils in each of the rotor slots 202 to insulate them from one another to reduce the likelihood of undesirable connections between the coils. One or more wedges 410 are positioned at the outer diameter or the top of each rotor slot 202 to wedge the coils and insulation in place to reduce undesirable movement during operation. The retaining rings 114 are then coupled to the rotor shaft 122 with each retaining ring 114 engaging one of the retaining ring fits 404 to allow the retaining ring 114 to cover and protect the end turns 406 while also holding the end turns 406 in place.

Figure 5:
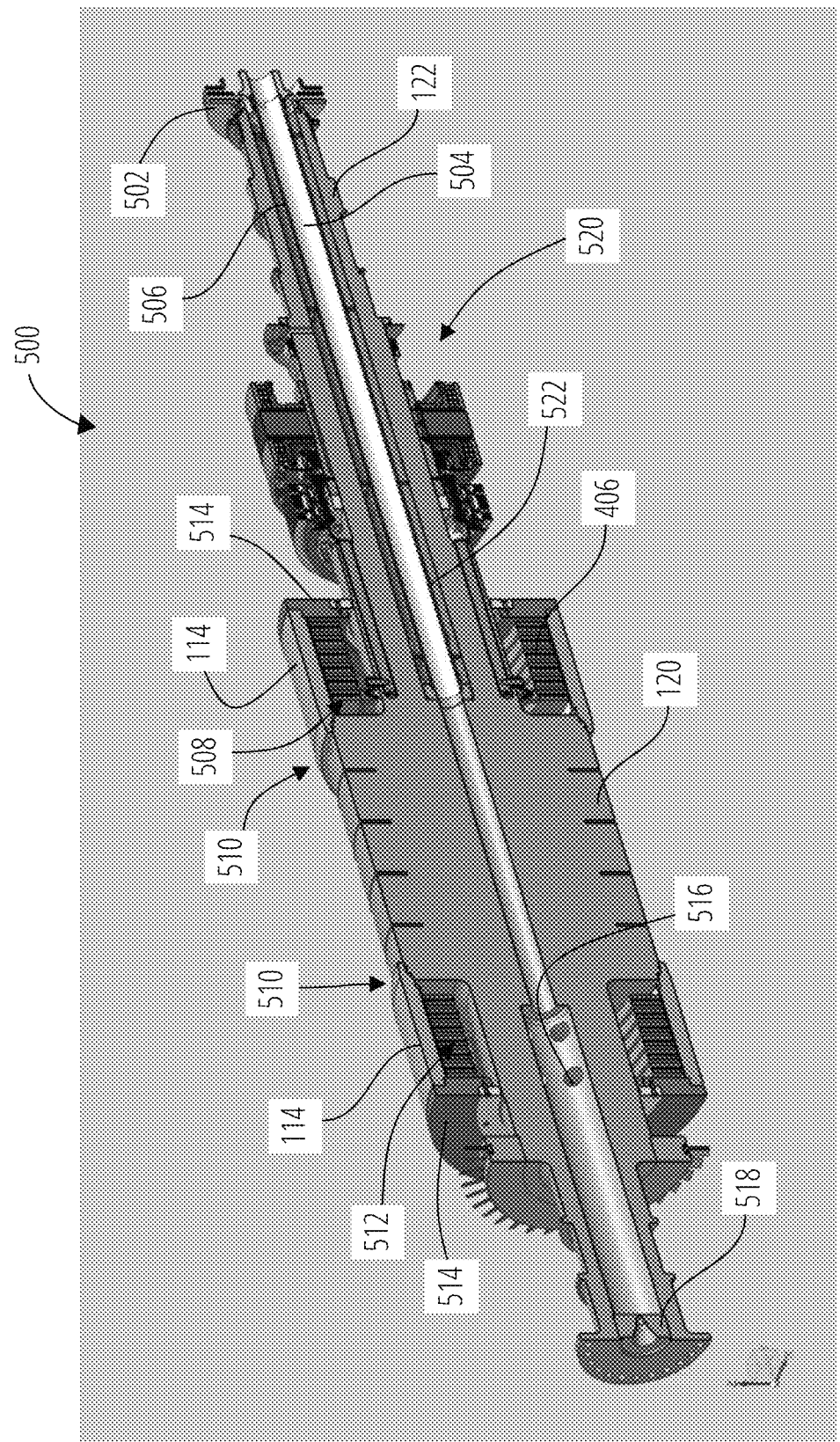
FIG. 5 is a perspective section view of a rotor including a pressurized rotor cooling system suitable for use in the generator of FIG. 1.

FIG. 5 illustrates a rotor 500 suitable for use in the generator 100 of FIG. 1. The rotor 500 includes a rotor cooling system 520 that allows for the circulation of a pressurized coolant, typically air through the rotor body 120 to cool the rotor body 120, and more specifically the rotor windings 204 and provide for more efficient operation at a higher power density than what could otherwise be achieved.

The rotor cooling system 520 is a closed system that may receive compressed air from a stationary compressor (not shown) such that the air (or other gas if employed) within the system is maintained at a desired high-pressure (i.e., greater than atmospheric pressure). The rotor cooling system 520 includes a coolant pump 502, an inlet bore 504, a discharge annulus 506, one or more inlet apertures 516, a first coolant space 512, and a second coolant space 508. The coolant pump 502 in the illustrated construction includes a centrifugal pump or other mechanism directly connected to the rotor shaft 122 for co-rotation therewith and capable of circulating the already pressurized air, or other gas through the rotor cooling system 520. The coolant pump 502 is arranged to exhaust warm air to be cooled in a heat exchanger (not shown) and then returned to the inlet bore 504 as part of the closed loop, high-pressure rotor cooling system 520, with other arrangements being possible.

The inlet bore 504 extends the full length of the rotor 500 and includes a plug 518 positioned at one end to seal the inlet bore 504, thereby facilitating the containment of the high-pressure coolant therein. One or more inlet apertures 516 extend through the rotor shaft 122 to provide a fluid connection between the inlet bore 504 and the first coolant space 512. In the illustrated construction, multiple inlet apertures 516 extend radially through the rotor shaft 122. The number of inlet apertures 516 and the size of those inlet apertures 516 are selected to assure the desired flow rate between the inlet bore 504 and the first coolant space 512.

The first coolant space 512 contains one set of end turns 406 and is defined by the cooperation of the rotor shaft 122, the rotor body 120, one of the retaining rings 114, and an end plate 514. A first end of the retaining ring 114 cooperates with the rotor body 120 to define a first ring seal area 510. The second opposite end of the retaining ring 114 engages an outer diameter of the end plate 514. An inner diameter of the end plate 514 engages the rotor shaft 122 to seal the first coolant space 512. It should be noted that while the end plate 514 is described as a single component, multiple components or parts could cooperate to define the end plate 514.

The first coolant space 512 is fluidly connected to the rotor slots 202 to facilitate the flow of high-pressure coolant from the first coolant space 512 to the second coolant space 508. The second coolant space 508 contains the second set of end turns 406 opposite the first set of end turns 406. The second coolant space 508 is substantially the same as the first coolant space 512 and is defined by the cooperation of the rotor shaft 122, the rotor body 120, the other of the retaining rings 114, and another end plate 514. The second coolant space 508 collects the high-pressure coolant from the rotor slots 202 and directs that flow to the discharge annulus 506.

The discharge annulus 506 is formed by the cooperation of the rotor bore and an annular sleeve 522 positioned within the rotor bore and spaced apart from the outer wall of the rotor bore. Thus, the annular sleeve 522 divides the rotor bore into the inlet bore 504 inside of the rotor annular sleeve 522, and the discharge annulus 506 formed by the cooperation of the rotor bore and the annular sleeve 522.

Figure 6:
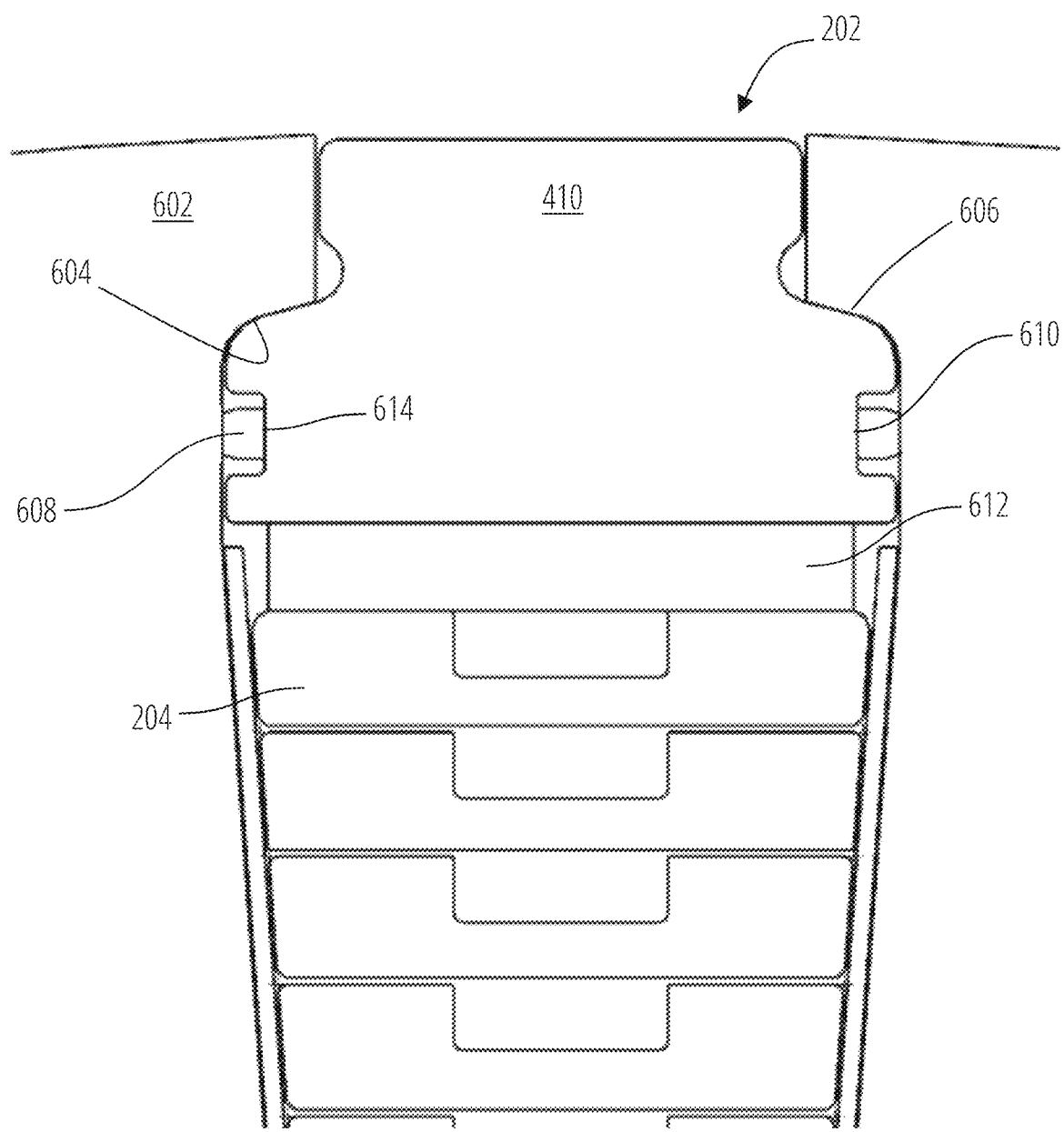
FIG. 6 is an axial end view of a portion of a rotor slot of the rotor of FIG. 5.

FIG. 6 illustrates the top or outside diameter portion of one of the rotor slots 202 better showing the placement of the wedge 410. In the illustrated construction, each tooth 602 defines a tooth hook 604 that extends at an oblique angle with respect to a radial axis of the rotor 200.

Each of the wedges 410 includes two wedge hooks 606 and two seal slots 610. Each wedge hook 606 includes an oblique surface arranged to engage one of the tooth hooks 604. Each of the seal slots 610 includes a rectangular cross-section groove that extends along the wedge 410 in a direction that is substantially parallel to the longitudinal axis of the rotor 200. While the illustrated construction includes a rectangular seal slot 610, other shapes could be employed if desired. The seal slots 610 can be part of the wedge extrusion or can be machined into the wedge 410 after it is extruded, as may be desired.

A seal member 608 (or seal component) is positioned within the seal slots 610 and is sized to form a fluid-tight seal between the teeth 602 that define the rotor slot 202 and the wedge 410 positioned within the rotor slot 202. In the illustrated construction, the seal member 608 has a D-shaped cross-section. Of course, other shapes (e.g., O-shaped cross-section) or other seal members could be employed if desired.

In the illustrated construction, the wedge 410 and the seal members 608 extend the full length of the rotor slot 202 to reduce the likelihood of a leak. In addition, in the illustrated construction, each side of the wedge 410 supports a separate seal member 608. However, other constructions could employ a seal member 608 in the form of a continuous loop if desired.

One seal member 608 suitable for use in the construction of FIG. 6 includes a resilient material formed in a "D" shape (i.e., a D-shaped cross section) but being a single component with two separate ends rather than formed in a loop. In addition, some constructions include an adhesive portion 614 or material on the flat side of the D-shaped cross section. The adhesive portion 614 attaches the seal member 608 to the wedge 410 to reduce the likelihood of relative movement or unwanted stretching of the seal member 608 during installation of the wedge 410. Two separate seal members 608 are used with one positioned on either side of the wedge 410. Suitable resilient materials include rubber, synthetic rubber, or other compliant materials.

Figure 7:
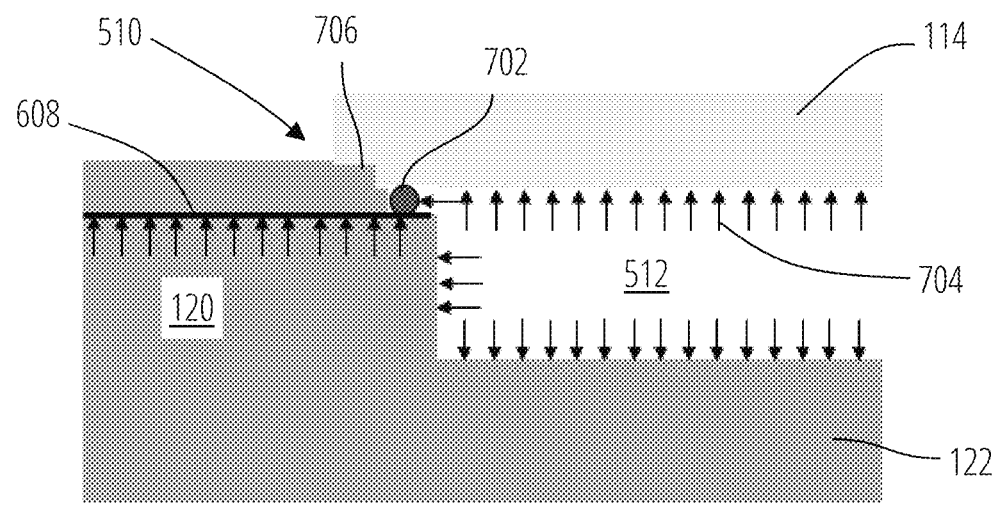
FIG. 7 is a schematic section view of a portion of the slot of FIG. 6.

FIG. 7 illustrates in greater detail a ring seal area 510 positioned adjacent the first coolant space 512. However, it should be understood that the illustrated ring seal area 510 could also be positioned adjacent the second coolant space 508.

The ring seal area 510 includes two separate seals formed between the retaining ring 114 and the rotor body 120. A shrink-fit seal 706 is formed between the retaining ring 114 and the rotor body 120 when the retaining ring is positioned in its operating position with a proper shrink-fit. A ring seal 702 is positioned between the retaining ring 114 and the rotor body 120 to form another circumferential seal. The ring seal 702 defines an inner diameter that coincides with the position of the seal member 608 such that the ring seal 702 also cooperates with the seal member 608 to complete the sealing of the first coolant space 512. Pressure 704 applied by the high-pressure coolant is fully contained with the only path from the first coolant space 512 being through the rotor slots 202 and rotor windings 204 contained therein. In the illustrated construction, the ring seal 702 is a continuous circular seal member having an O-shaped cross section. Of course, other shapes (e.g., D-shaped cross-section) or arrangements could be employed. While typical ring seals 702 are formed from resilient material (e.g., rubber), other constructions could employ more rigid materials, composite seals, spring-based seals, and the like. As such, the ring seal 702 should not be limited to the arrangement illustrated in FIG. 7.

Figure 8:
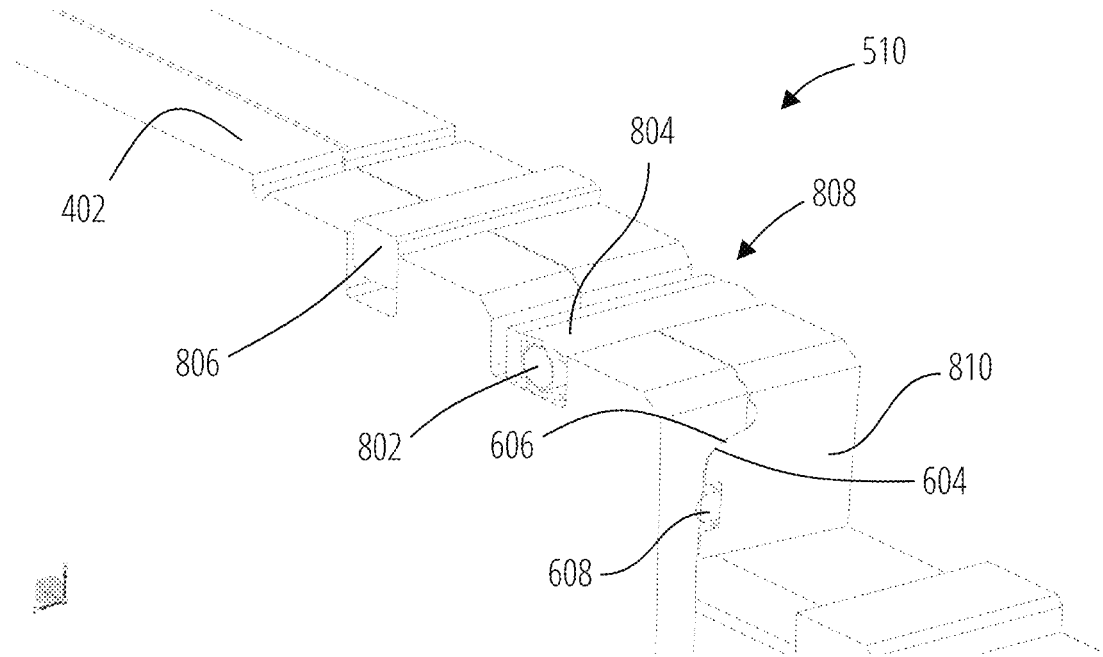
FIG. 8 is a perspective partially broken away view of a portion of an axial end of a slot of the rotor of FIG. 5 illustrating a first ring seal area.

FIG. 8 illustrates another arrangement of the ring seal area 510 suitable for use with either or both retaining rings 114 (not shown in FIG. 8). The arrangement of FIG. 8 at least partially forms a seal between the retaining ring 114 and the rotor body 120, and more specifically, the rotor teeth 402 and the wedge 810 with the same shrink-fit discussed with regard to FIG. 7.

The construction of FIG. 8 includes a ring seal 808 that is a composite of a resilient member 802 and a sleeve 804. The resilient member 802 could include a solid, continuous member having an O-shaped cross-section or could be formed from other more rigid materials or composites as described with regard to the ring seal 702 of FIG. 7. In another construction, the resilient member 802 includes a spring-energized seal formed from a coiled material much like a coiled spring (e.g., slanted coil spring, helical spring, etc.). Thus, in this construction, the resilient member 802 has an annular cross section.

The sleeve 804 is formed to have a U-shaped cross-section that defines a receiving space in which the resilient member 802 is positioned. The sleeve 804 covers and protects the resilient member 802 during operation and directly contacts the rotor body 120, the wedge 810, and the retaining ring 114 when the retaining ring 114 is in its operating position It should also be noted that the open end of the U-shaped cross-section is arranged to face the direction where the high-pressure fluid is disposed (i.e., toward the first coolant space 512 and the second coolant space 508). In this arrangement, should the sleeve 804 be exposed to high-pressure fluid, it would tend to expand the U-shaped cross-section, thereby enhancing the sealing effect of the ring seal 808.

Unlike the construction of FIG. 7, the ring seal 808 includes an inside diameter portion that is disposed radially outward of the seal member 608. Rather than cooperating with the seal member 608 to form the seal, the ring seal 808 is positioned to pass through the intersection of the tooth hook 604 and the wedge hook 606. In this position the same effective seal is formed. Of course, the ring seal 808 could be positioned radially inward of the illustrated position such that it contacts the seal member 608 and forms a seal much like that described with regard to FIG. 7 if desired.

A retaining ring key 806 is positioned within a slot formed in the rotor body 120 and wedge 810 and cooperates with the retaining ring 114 to maintain the retaining ring 114 in its desired operating position.

Figure 9:
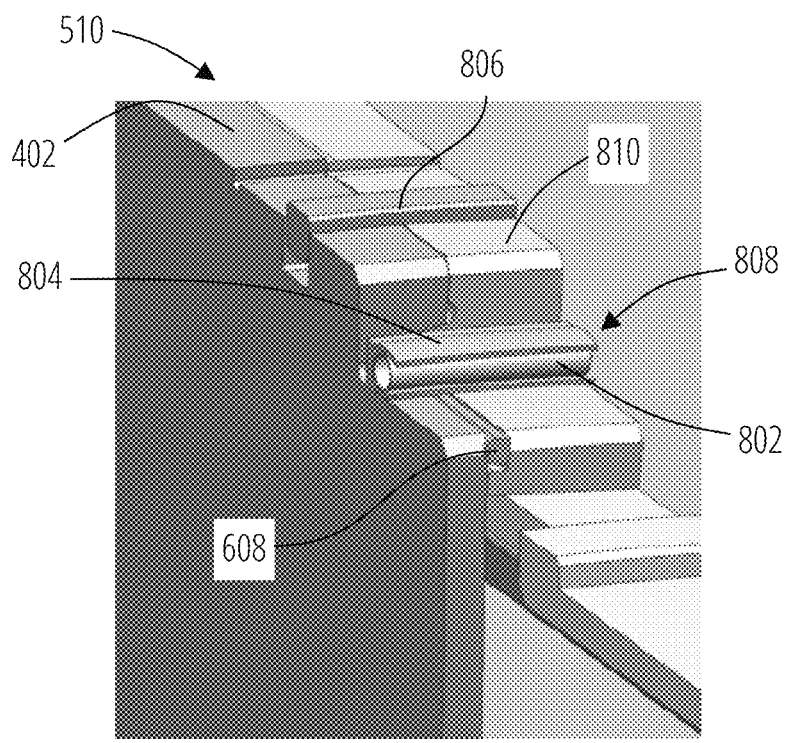
FIG. 9 is a perspective partially broken away view of a portion of another axial end of a slot of the rotor of FIG. 5 illustrating another first ring seal area.

FIG. 9 illustrates a construction that is similar to that of FIG. 8 with the exception of the positioning of the ring seal 808. In the construction of FIG. 9, the inner diameter of the ring seal 808 coincides with the seal member 608 such that the ring seal 808 and the seal member 608 cooperate to define at least a portion of the seal between the retaining ring 114, the rotor body 120, and the wedge 810.

Figure 10:
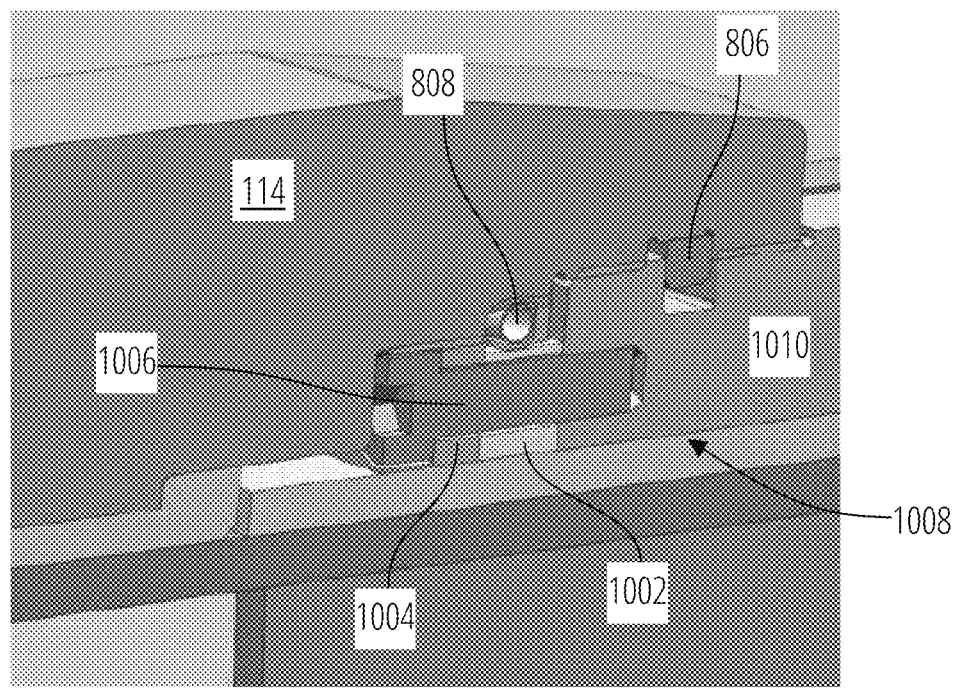
FIG. 10 is a perspective partially broken away view of a portion of another axial end of a slot of the rotor of FIG. 5 illustrating another first ring seal area.

FIG. 10 illustrates another construction of a wedge 1008 suitable for use in place of, or in conjunction with the wedge 410, 810. The wedge 1008 includes a wedge body 1010, a wedge insert 1002, a wedge cap 1004, and one or more wedge bolts 1006. The wedge body 1010 is similar to the wedge 810 but is shorter such that the remaining components, positioned at either end complete the wedge 1008 and the wedge 1008 is the same length as the wedge 810. While FIG. 10 illustrates one end of the wedge 1008, it should be understood that the same or a similar arrangement can be formed at either end. As such, only one end will be described in detail.

The wedge insert 1002 is positioned to abut the end of the wedge body 1010 and may have a cross-sectional shape that is the same as or similar to the cross-sectional shape of the wedge body 1010. The wedge insert 1002 is formed from a resilient material that expands radially and circumferentially in response to an axial compression. The material used is selected to provide the desired expansion as will be discussed in greater detail. The wedge cap 1004 forms a seal due to Poisson's effect. However, another type of wedge insert may work based on geometric interference. In this arrangement, the wedge insert may have a tapered form with a thin outer wall, which allows it to be pressed in axially. The thin outer wall will deflect and provide sufficient contact pressure to seal if a sufficiently compliant material is utilized. In yet another arrangement, the wedge insert includes a compliant outer wall and a washer that is inserted to expand the outer wall. In still another construction, a wedge insert is pressed into place with an interference fit. The wedge bolt 1006 holds the wedge insert in place but there is little to no expansion caused by the tightening of the wedge bolt 1006. In one construction, the wedge insert is frozen before insertion to aid in the assembly process.

The wedge cap 1004 is positioned to abut the wedge insert 1002 such that the wedge insert 1002 is sandwiched between the wedge cap 1004 and the wedge body 1010. The wedge cap 1004 has the same or a similar cross-sectional shape as the wedge body 1010 and is generally formed from a similar material. The wedge bolts 1006 pass through the wedge cap 1004 and the wedge insert 1002 and threadably engage the wedge body 1010. As the wedge bolts 1006 are tightened, the wedge insert 1002 is compressed and expands or bulges in the radial and circumferential directions. This expansion enhances the contact between the wedge insert 1002 and any adjacent components to form a more effective seal therebetween.

The remaining construction of the ring seal area 510 of FIG. 10 is similar to that of FIG. 8. The ring seal 808 is positioned with it's inside diameter abutting or near an outside diameter of the wedge insert 1002. The construction of the ring seal 808 is otherwise the same as that described with regard to FIG. 8 and FIG. 9. The retaining ring key 806 is also formed and positioned in a manner similar to that described with regard to FIG. 8 and FIG. 9.

The wedge 1008 includes two seal members 608 as described above. The seal members 608 can engage each of the wedge body 1010, the wedge inserts 1002, and the wedge caps 1004 in much the same manner as described above. In addition, the ring seal 808 is positioned at a diameter outside of the seal members 608 as was described with regard to the construction of FIG. 8.

It should be noted that the features described above could be combined with one another to define different arrangements of the ring seal area 510. Thus, the arrangement should not be limited to the few examples provided herein.

Figure 11:
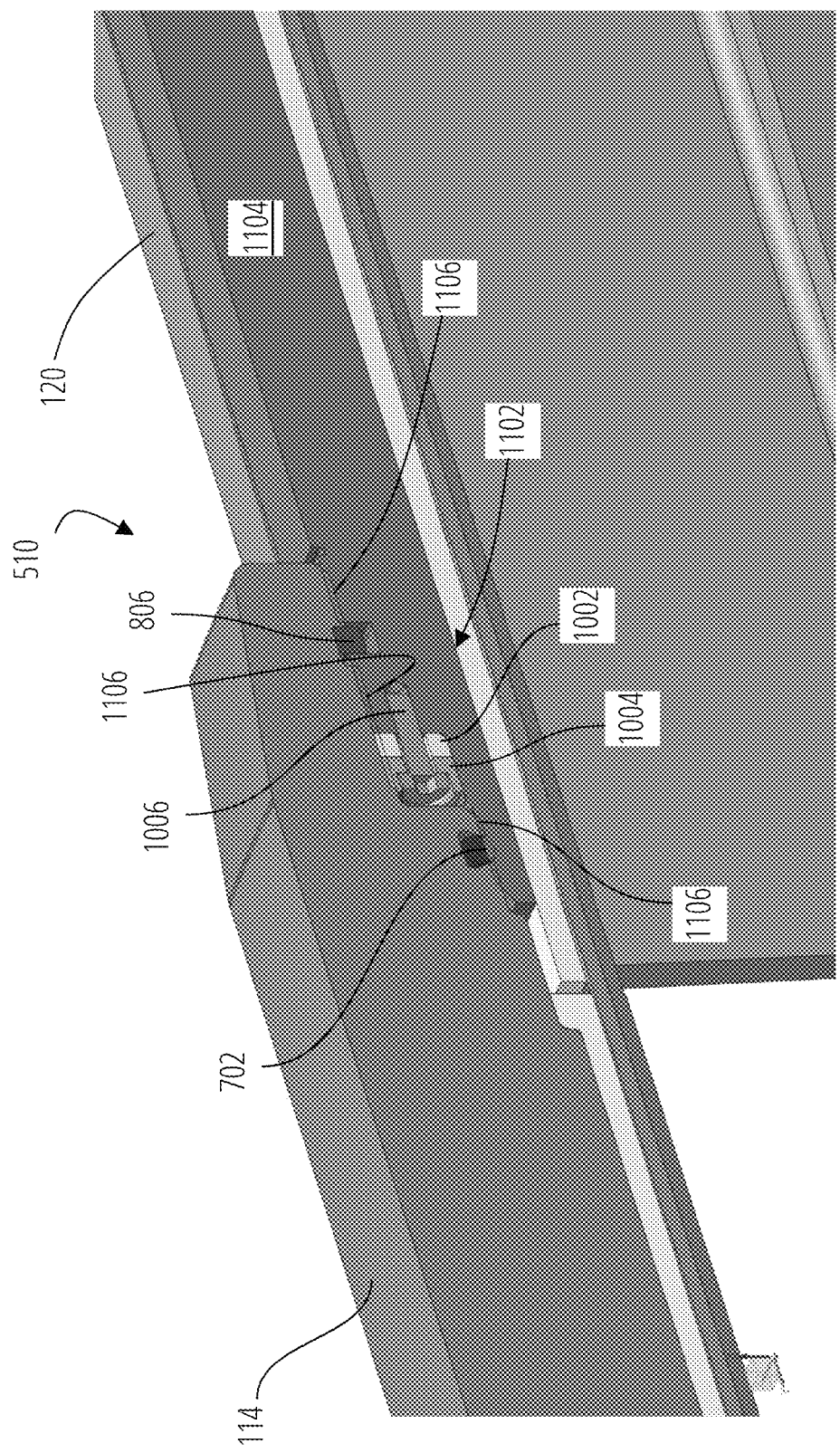
FIG. 11 is a perspective partially broken away view of a portion of another axial end of a slot of the rotor of FIG. 5 illustrating another first ring seal area.

FIG. 11 illustrates an example of a combination of different elements described above that cooperate to define the ring seal area 510. In the illustrated construction, a wedge 1102 includes a wedge body 1104, a wedge insert 1002, a wedge cap 1004, and one or more wedge bolts 1006. The wedge body 1104 includes a removed section that receives the wedge insert 1002 such that an inner diameter of the wedge insert 1002 is positioned adjacent to or in contact with the wedge body 1104. In addition, a planar face of the wedge insert 1002 abuts a planar face of the wedge body 1104. The wedge cap 1004 is positioned in a manner similar to that described for the wedge insert 1002 except that the wedge cap 1004 abuts the wedge insert 1002. Thus, the wedge insert 1002 is sandwiched between the wedge cap 1004 and the wedge body 1104. As discussed with regard to the construction of FIG. 10, the wedge insert 1002 and the wedge cap 1004 may have the same or similar cross-sectional shapes as the wedge body 1104. The wedge bolts 1006 pass through the wedge cap 1004 and the wedge insert 1002 and threadably engage the wedge body 1104 to compress the wedge insert 1002 to cause the desired radial and circumferential expansion. In this construction, the wedge insert 1002 directly contacts the retaining ring 114 and the wedge body 1104 to form a first seal.

A ring seal 702 is positioned between the wedge body 1104 and the retaining ring 114 at an axial position away from the rotor body 120. The illustrated ring seal 702 is similar to the ring seal 702 described with regard to FIG. 7 and will not be described in detail. Of course, the ring seal 702 could be replaced with a ring seal similar to or identical to the ring seal 808 described with regard to FIG. 8 if desired.

Similar to the arrangements of FIG. 7 through FIG. 10, the retaining ring key 806 is positioned at an end near the rotor body 120 and operates much like the retaining ring keys previously described. Finally, the arrangement of FIG. 11 includes three distinct shrink-fit locations 1106 that operate to further enhance the seal in the ring seal area 510.

In operation, an exciter or other system provides current at a desired voltage to the rotor 200. The current flows through the rotor windings 204 to establish two magnetic poles in a two-pole generator and more poles in higher pole generators. The turbine, or other prime mover is coupled to the rotor 200 and operates to rotate the rotor 200 at a desired speed. For a synchronous generator with a two-pole rotor 200, the rotor is rotated at 3600 RPM to generate 60 Hz electricity. For electricity at 50 Hz, the rotor 200 is rotated at 3000 RPM.

The rotating magnetic field of the rotor 200 interacts with the stator 300 of the generator to induce an alternating three phase current at a frequency that is proportional to the speed of the rotor 200. Each of the rotor 200 and the stator 300 can be cooled to increase the current density of the rotor 200 and the stator 300 while also maintaining a desired efficiency and maintenance interval.

The rotor 500 includes a rotor cooling system 520 and is assembled or re-assembled after maintenance by first positioning the coils or rotor windings 204 in the various rotor slots 202. The rotor windings 204 are stacked to extend radially outward to substantially fill the rotor slots 202 and are electrically connected to define one of the poles of the rotor 500.

Because the wedges 410, 810, 1008, 1102 are substantially the same as one another, the assembly will be described with regard to the wedge 1102. However, it should be clear that many of the steps are equally applicable to some or all of the other wedges 410, 810, 1008, 1102.

The seal members 608 are positioned on the sides of the various wedges 1102 (see FIG. 6). As described, the seal members 608 are D-shaped and in some constructions, the flat side of the D-shape includes an adhesive that facilitates the attachment of the seal members 608 to the wedge 1102.

The seal members 608 are located radially inside the wedge hooks 606 and therefore are inserted into each wedge 1102 before assembly into the rotor slots 202. This location of the seal members 608 increases the likelihood that the seal members 608 would be contained within the rotor slot 202 in the event of degradation or failure of the one of the seal members 608. The position of the seal members 608 further from the outer surface of the rotor 500 also aids in shielding the seal members 608 from large temperature excursions that may occur due to surface currents or other heating effects. The seal members 608 also aid in isolating the rotor windings 204 from the wedge hook 606 such that any conductive wedge plating material that might be loosened during wedging is blocked from the rotor windings 204, thereby reducing the likelihood of a ground fault from this material.

The wedges 1102 are next installed in the various rotor slots 202 to support the rotor windings 204 in the desired position during operation. The seal members 608 are compressed against the walls of the rotor body 120 that define the rotor slot 202 in which each wedge 1102 is installed, thereby forming a primary seal in each of the rotor slots 202. The contact pressure between the wedge hook 606 and the tooth hook 604 of each rotor slot 202 also acts as a secondary seal to inhibit unwanted leakage out of the rotor slots 202. Thus, the installation of the wedges 1102 provides an axially disposed seal that inhibits leakage from the radial outer opening of the rotor slots 202. However, each end of the rotor slots 202 are still unsealed.

The wedge 1102 requires some additional assembly that may not be required with the other wedges 410, 810 and this assembly can be performed prior to the installation of the wedge 1102 in the rotor 500 or after, as may be desired. Each end of the wedge 1102 receives a wedge insert 1002. Next, a wedge cap 1004 is positioned adjacent each of the wedge inserts 1002. Each of a plurality of wedge bolts 1006 passes through one of the wedge caps 1004 and the wedge inserts 1002 and threadably engages the wedge body 1104. Tightening of the wedge bolts 1006 compresses the wedge inserts 1002 axially which simultaneously expands the wedge inserts 1002 radially and circumferentially. The expansion of the wedge insert 1002 facilitates cooperation between the wedge body 1104, the retaining ring 114 (after it is installed) or the ring seal 808, and the rotor teeth 402 to further enhance the seal therebetween. It should be noted that the wedge insert 1002 and the wedge cap 1004 could be installed on the wedge body 1104 without tightening the wedge bolt 1006. Then after the wedge 1102 is in its operating position, the wedge bolts 1006 can be tightened to provide the desired compression of the wedge inserts 1002.

With reference to FIG. 10, the ring seals 808 are next positioned on each end of the rotor 500. Both the ring seals 808 are preferably continuous circular seals that extend around the circumference of the rotor 500 and engage the rotor teeth 602 as well as the wedges 1102. The ring seal 808 is positioned radially outward of the wedge insert 1002 and can be positioned prior to the tightening of the wedge bolts 1006 or after the tightening of the wedge bolts 1006. Generally, positioning the ring seal 808 in its desired operating position prior to the tightening of the wedge bolts 1006 will be easier, as the ring seal 808 will have a slightly looser fit before the expansion of the wedge inserts 1002.

It should be noted that FIG. 11 illustrates a slightly different position of the ring seal 702 and also employs the ring seal 702 of FIG. 7, rather than the ring seal 808 of FIG. 8. It is important to note that the concepts described herein can be re-arranged and used in different combinations to achieve the necessary sealing for the particular design. As such, the sealing arrangements described should be thought of only as examples and should not be considered limiting in any way.

Next, the retaining rings 114 are installed as illustrated in FIG. 10 and FIG. 11. In a typical installation, the retaining rings 114 are heated prior to installation to thermally expand the retaining rings 114 to provide a desired shrink fit at one or more shrink-fit locations 1106. Once installed, the retaining rings 114 cooperate with the rotor body 120, the rotor shaft 122, and the end plates 514 to define the first coolant space 512 and the second coolant space 508.

As illustrated in FIG. 11, the retaining ring 114 cooperates with each wedge body 1104 to define three shrink-fit locations 1106 that form seals. In addition, the ring seal 702 cooperates with the retaining ring 114 and the wedge body 1104 to define the primary seal. Finally, the wedge insert 1002, once expanded provides yet another seal point between the rotor 500 and the retaining rings 114 such that there are multiple effective seal points to inhibit leakage from the first coolant space 512 and the second coolant space 508.

With reference to FIG. 5, the operation of the rotor cooling system 520 will be described. During rotation of the rotor 500, the coolant pump 502 draws directs warm air from the discharge annulus 506 to an outside air cooler or heat exchanger. The cooled air then flows along the inlet bore 504 to the inlet apertures 516 where the high-pressure air (generally greater than atmospheric pressure) is admitted to the first coolant space 512. The first coolant space 512 is in fluid communication with each of the rotor slots 202 such that high pressure air may enter the rotor slots 202. The high-pressure air flows the length of the rotor slots 202 to provide cooling and is collected in the second coolant space 508. The high-pressure air is directed from the second coolant space 508 to the discharge annulus 506 where it is drawn into the coolant pump 502 and discharged from the rotor 500. The seals described above reduce the likelihood of leakage form the first coolant space 512, the second coolant space 508, and the rotor slots 202.

The proposed high-power density generator rotor 500 makes the rotor 500 the pressure vessel, where each rotor slot 202, first coolant space 512, and the second coolant space 508 are pressurized. The wedges 410, 810, 1008, 1102 include two compliant seal members 608 which are in contact with the side walls of the rotor slot 202. These seal members 608 ensure the rotor slots 202 are leak tight.

The pressurized rotor slots 202 allow direct cooling of the rotor windings 204 with high-pressure fluid without increased friction loss and without many complex, dual purpose electrical/fluid connections. Direct cooling with pressurized fluid allows machine operation with increased field currents, and ultimately higher power density than prior air-cooled machines.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A generator rotor including a rotor shaft having a rotor slot, the generator rotor comprising:
a rotor winding at least partially disposed within the rotor slot;
a wedge coupled to the rotor shaft and extending axially along the rotor shaft, the wedge positioned to inhibit radial movement of the rotor winding from the rotor slot;
a seal member coupled to the wedge and extending axially along the wedge, the seal member cooperating with the wedge and the rotor shaft to define a seal therebetween, wherein the wedge, the seal member, and the rotor shaft cooperate to at least partially define an enclosed space operable to contain a high-pressure coolant, wherein the wedge includes a first seal slot formed in a first side of the wedge and a second seal slot formed in a second side of the wedge, and wherein a seal member is positioned within the first seal slot and the second seal slot.

2. The generator rotor of claim 1, further comprising a first retaining ring, a first end plate, a second retaining ring, and a second end plate that cooperate with the rotor shaft and the wedge to enclose the enclosed space.

3. The generator rotor of claim 2, further comprising a ring seal positioned to contact the first retaining ring and the rotor shaft.

4. The generator rotor of claim 3, further comprising a wedge insert, a wedge cap, and a wedge bolt, and wherein the wedge insert is sandwiched between the wedge cap and the wedge, and wherein the wedge bolt operates to compress the wedge insert in an axial direction and to expand the wedge insert in a circumferential direction and a radial direction.

5. The generator rotor of claim 3, wherein the ring seal includes a spring-energized composite seal member that includes a resilient portion and a separate spring portion.

6. The generator rotor of claim 5, wherein the spring portion includes a helical spring portion.

7. The generator rotor of claim 1, wherein the seal member is formed from a resilient material and has a D-shaped cross-section.

8. The generator rotor of claim 7, further comprising an adhesive material coupled to a flat side of the D-shaped seal member, the adhesive material operable to attach the seal member to the wedge.

9. The generator rotor of claim 1, wherein the seal member includes a first seal component that extends the full length of the first seal slot and a second seal component that extends the full length of the second seal slot, the first seal component and the second seal component separate from one another.

10. A generator rotor including a rotor shaft having a rotor slot, the rotor comprising:
a rotor winding at least partially disposed within the rotor slot;
a wedge coupled to the rotor shaft and positioned to inhibit radial movement of the rotor winding from the rotor slot;
a seal member coupled to the wedge, the seal member cooperating with the wedge and the rotor shaft to define a first space;
a first retaining ring coupled to the rotor shaft to define a second space between the first retaining ring and the rotor shaft;
a second retaining ring coupled to the rotor shaft to define a third space between the second retaining ring and the rotor shaft, the second space configured to receive a high-pressure coolant and direct the high-pressure coolant to the first space and the third space; and
a ring seal extending circumferentially around the rotor shaft and positioned to contact the first retaining ring and the seal member.

11. The generator rotor of claim 10, wherein the wedge includes a first seal slot formed on a first side of the wedge and a second seal slot formed on a second side of the wedge, the first seal slot and the second seal slot extending axially along the length of the wedge, and wherein a first seal component extends the full length of the first seal slot and a second seal component extends the full length of the second seal slot.

12. The generator rotor of claim 11, wherein the first seal component and the second seal component are each formed from a resilient material and have a D-shaped cross-section.

13. The generator rotor of claim 11, wherein the first seal component includes an adhesive member coupled to a flat side of the D-shaped first seal component, the adhesive member operable to attach the first seal component to the wedge.

14. The generator rotor of claim 10, further comprising a wedge insert, a wedge cap, and a wedge bolt, and wherein the wedge insert is sandwiched between the wedge cap and the wedge, and wherein the wedge bolt operates to compress the wedge insert in an axial direction and to expand the wedge insert in a circumferential direction and a radial direction.

15. The generator rotor of claim 14, wherein the ring seal is positioned radially outward of and in contact with the wedge insert.

16. A generator rotor including a rotor shaft having a rotor slot, the rotor comprising:
a rotor winding at least partially disposed within the rotor slot;
a wedge coupled to the rotor shaft and extending in an axial direction, the wedge positioned to inhibit radial movement of the rotor winding from the rotor slot;
a wedge insert positioned adjacent the wedge;
a wedge cap positioned adjacent the wedge insert to sandwich the wedge insert between the wedge cap and the wedge;
a wedge bolt threadably engaged with the wedge and operable to compress the wedge insert in the axial direction and to expand the wedge insert in the radial and circumferential directions;
a ring seal extending around a circumference of the rotor and positioned axially outboard of the wedge insert; and
a retaining ring coupled to the wedge such that each of the ring seal and the wedge insert cooperate with the retaining ring and the wedge to form a seal therebetween.

17. The generator rotor of claim 16, wherein the wedge includes a first seal slot that extends axially along a first side of the wedge and a second seal slot that extends axially along a second side of the wedge, and wherein a first seal component extends the full length of the first seal slot and a second seal component extends the full length of the second seal slot, each of the first seal component and the second seal component having a D-shaped cross section.

18. The generator rotor of claim 16, further comprising an end plate coupled to the rotor and the retaining ring, the end plate, the retaining ring, and the rotor cooperating to fully enclose a space.

* * * * *